(12) United States Patent  
Rochlitzer et al.

(10) Patent No.: US 12,505,147 B2  
(45) Date of Patent: Dec. 23, 2025

(54) PROCESS ANALYSIS FEEDBACK MAPPING FRAMEWORK

(71) Applicant: SAP SE, Walldorf (DE)

(72) Inventors: Alexander Rochlitzer, Frankfurt (DE); Gregor Berg, Berlin (DE); Timotheus Kampik, Umeå (DE); Manuel Meindl, Deggendorf (DE); Ron Agam, Munich (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/593,196

(22) Filed: Mar. 1, 2024

(65) Prior Publication Data

US 2025/0278428 A1    Sep. 4, 2025

(51) Int. Cl.
*G06F 16/358*    (2025.01)
*G06F 16/3329*    (2025.01)
*G06F 16/353*    (2025.01)

(52) U.S. Cl.
CPC ........ *G06F 16/358* (2019.01); *G06F 16/3329* (2019.01); *G06F 16/353* (2019.01)

(58) Field of Classification Search
CPC ... G06F 16/358; G06F 16/353; G06F 16/3329
See application file for complete search history.

(56) References Cited

U.S. PATENT DOCUMENTS

| | | | | |
|---|---|---|---|---|
| 9,213,540 | B1 * | 12/2015 | Rickey | G06F 8/71 |
| 11,348,160 | B1 * | 5/2022 | Shukla | G06Q 30/0281 |
| 2014/0129297 | A1 * | 5/2014 | Iwama | G06Q 10/06393 |
| | | | | 705/7.39 |
| 2023/0169527 | A1 * | 6/2023 | Morningstar | G06N 5/02 |
| | | | | 705/7.32 |
| 2024/0112123 | A1 * | 4/2024 | Yesilmen | G06F 40/205 |
| 2024/0177172 | A1 * | 5/2024 | Ghoche | G06Q 10/06316 |

OTHER PUBLICATIONS

Brand et al. "Using LLMs for Market Research", https://www.hbs.edu/ris/Publication%20Files/23-062_ed720ebc-ec4d-4bc3-a6ba-bad8cfbd9d51.pdf, 2023. (Year: 2023).*

Hassanat et al., Mar. 2022 "Framework for Automating Multi-Team Workflows to Maximize Operational Efficiency and Minimize Redundant Data Handling" pp. 663-674. (Year: 2022).*

* cited by examiner

*Primary Examiner* — Matthew J Ellis

(74) *Attorney, Agent, or Firm* — Buckley, Maschoff & Talwalkar LLC

(57) ABSTRACT

A process data store may contain a process model (e.g., a process graph, with process graph elements that include nodes and edges, as generated via process mining or a BPMN representation). A process server may retrieve information from the process data store and receive user feedback data. The server may determine if the information retrieved from the process data store is associated with a prior mapping of survey questions to the information retrieved from the process data store. If the information retrieved from the process data store is not associated with a prior mapping of survey questions, embodiments may utilize Machine Learning ("ML") to automatically map the user feedback data to the information retrieved from the process data store. The server may then automatically assign, group, and analyze the user feedback data to generate a recommended alteration.

14 Claims, 23 Drawing Sheets

FIG. 4 — Prior Art

PROCESS ANALYSIS FEEDBACK MAPPING FRAMEWORK

BACKGROUND

An enterprise may run various processes that are then analyzed using data-driven approaches. For example, a business might mine a process graph with nodes (e.g., activities) and edges (e.g., paths between nodes) representing the online sale and delivery of an item to customers. In many cases, the business may want to analyze processes to improve performance. Current approaches for business transformation focus on two distinct areas: trying to understand process-focused reality (with techniques such as process mining and Business Process Management ("BPM")); and answering experience-focused questions (with techniques to analyze unstructured text data such as sentiment analysis and topic analysis). However, while both approaches provide value, the direct influence of the one area on the other (and vice versa) may be neglected. That is, without considering how processes are experienced by affected stakeholders, one might end up with, for example, the quickest process but customer numbers may be declining due to overall negative sentiments. Similarly, solely investigating experiences does not expose the process reality that can lead to bad experiences (e.g., deliveries take too long but there is no visibility about which steps are involved and which may need fixing).

Instead, an enterprise may need to analyze both process-focused reality and corresponding sentiments (to get an "outside-in" perspective of business operations) where the "in" (e.g., operations) is experienced and judged from the outside (e.g., an experience journey) so that sentiments can be properly understood (either as an optimization target or as a constraint). Looking at the process reality may help the enterprise understand bottlenecks and other execution challenges of the process (which can lead to process adaptations). Moreover, looking at user sentiments may help the enterprise understand whether process adaptations will lead to higher satisfaction rates (for changes that increase customer value) or remain the same (for changes that increase profitability).

It would therefore be desirable to provide an integrated framework for process model analysis in a secure, automatic, and efficient manner.

SUMMARY

According to some embodiments, methods and systems associated with an enterprise may include a process data store that contains a process model (e.g., a process graph, with process graph elements that include nodes and edges, as generated via process mining or a Business Process Modeling Notation ("BPMN") representation). A process server may retrieve the process graph or process model representation from the process data store and receive user feedback data. The server may determine if the information retrieved from the process data store is associated with a prior mapping of survey questions to the information retrieved from the process data store. If the information retrieved from the process data store is not associated with a prior mapping of survey questions, embodiments may utilize Machine Learning ("ML") to automatically map the user feedback data to the information retrieved from the process data store. The server may then automatically assign, group, and analyze the user feedback data to generate a recommended alteration.

Some embodiments comprise: means for retrieving, by a computer processor of a process server, information from a process data store, wherein the process data store contains a process model (e.g., process graph, with process graph elements that include nodes and edges, as generated via process mining or a Business Process Modeling Notation ("BPMN") representation); means for receiving user feedback data; means for determining if the information retrieved from the process data store is associated with a prior mapping of survey questions to the information retrieved from the process data store; if the information retrieved from the process data store is not associated with a prior mapping of survey questions, means for utilizing Machine Learning ("ML") to automatically map the user feedback data to the information retrieved from the process data store; means for automatically assigning the user feedback data in accordance with the prior mapping or automatic mapping; means for automatically grouping the assigned user feedback data to generate aggregated and clustered data; and means for analyzing the aggregated and clustered data to automatically generate a recommended alteration of information in the process data store.

Some technical advantages of some embodiments disclosed herein are improved systems and methods to provide an integrated framework for process analysis in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
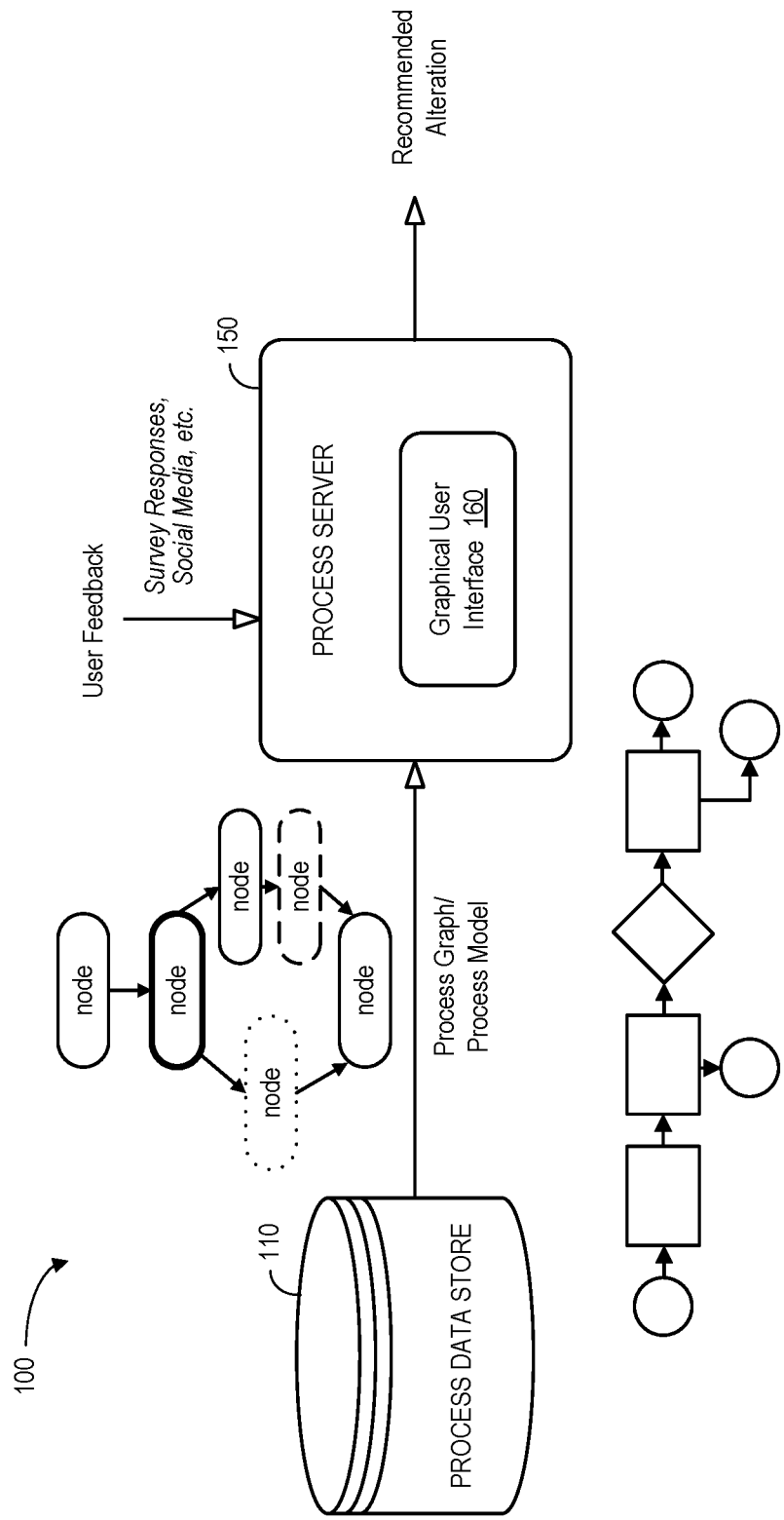
FIG. 1 is a high-level architecture of a system according to some embodiments.

FIG. 1 is a high-level block diagram of one example of a system 100 associated with an enterprise. In particular, a process data store 110 may exchange information with a process server 150 (e.g., a process modeling and analysis server with a manually crafted model or a computer-supported analysis via process mining). For example, the process modeling server 150 may receive a process graph or process model representation from the process data store 110 or from a process analytics engine (e.g., inferred from logs of business process execution traces). The process model representation might be, for example, an analytical representation of an organization's business processes.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The process server 150 may store information into and/or retrieve information from various data stores (e.g., the process data store), which may be locally stored or reside remote from the process server 150. Although a single process server 150 is shown in FIG. 1, any number of such devices may be included. Moreover, various devices described herein might be combined according to embodiments of the present invention. The system 100 functions may be performed by a constellation of networked apparatuses, such as in a distributed processing or cloud-based architecture.

An operator or administrator may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") 160 may let an operator or administrator define and/or adjust certain parameters via a remote device (e.g., to specify process details or adjustments) and/or provide or receive automatically generated recommendations, alerts, or results associated with the system 100.

Figure 2:
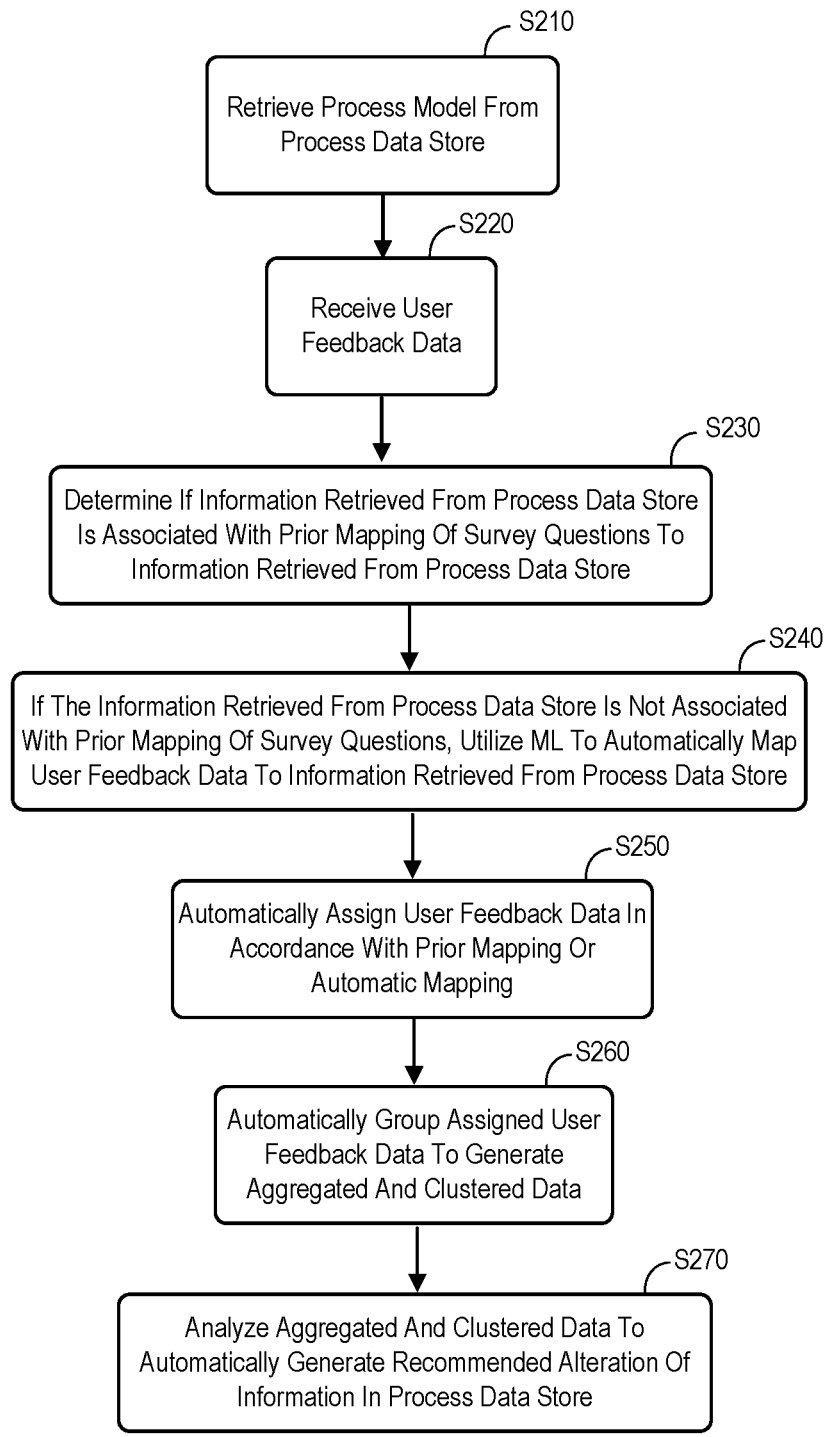
FIG. 2 is a method in accordance with some embodiments.

FIG. 2 is a method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a process server may retrieve information from a process data store. The process data store may contain, for example, a process model associated with a process graph, with process graph elements that include nodes and edges, as generated via process mining or a Business Process Modeling Notation ("BPMN") representation. At S220, the system may receive user feedback data. As used herein, the phrase "user feedback data" might represent user responses to survey questions that include numerical sentiment ratings, free text, and/or other elicitation techniques. Note that the user feedback data could be associated customers external to the enterprise, employees internal to the enterprise, etc. At S230, it is determined if the information retrieved from the process data store is associated with a prior mapping of survey questions. According to some embodiments, information in the process data store is associated with a process-driven scenario and the prior mapping of survey questions is associated with the design of the survey questions. According to some embodiments, the information in the process data store is associated with an experience-driven scenario. If the information in the process data store is not associated with a prior mapping of survey questions, at S240 Machine Learning ("ML") may be utilized to automatically map the user feedback data to the information in the process data store (e.g., based on terms used in responses). As used herein, the phrase "machine learning" may be associated with artificial intelligence techniques and statistical algorithms that learn and generalize from data in order to perform tasks without explicit instructions. According to some embodiments, the automatic mapping is performed via a Large Language Model ("LLM"). As used herein, the phrase "large language model" may refer to techniques that learn statistical relationships from text documents during a training process (e.g., via artificial neural networks, transformer-based architectures, recurrent neural network variants, etc.). According to some embodiments, the user feedback data comprises social media information (e.g., tweets, posts, reviews, etc.).

At S250, the system may automatically assign the user feedback data in accordance with the prior mapping or the automatic mapping. In some embodiments, the system performs automatically clustering and abstracting subsets of elements that are internal to the enterprise. At S260, the system may automatically group the assigned user feedback data and generate aggregated and clustered data. At S270, the aggregated and clustered data is automatically analyzed to automatically generate a recommended alteration. According to some embodiments, the process server is further to display graphical representations process elements, and selection of a graphical element results in an automatic display of aggregated and clustered data for that element.

Figure 3:
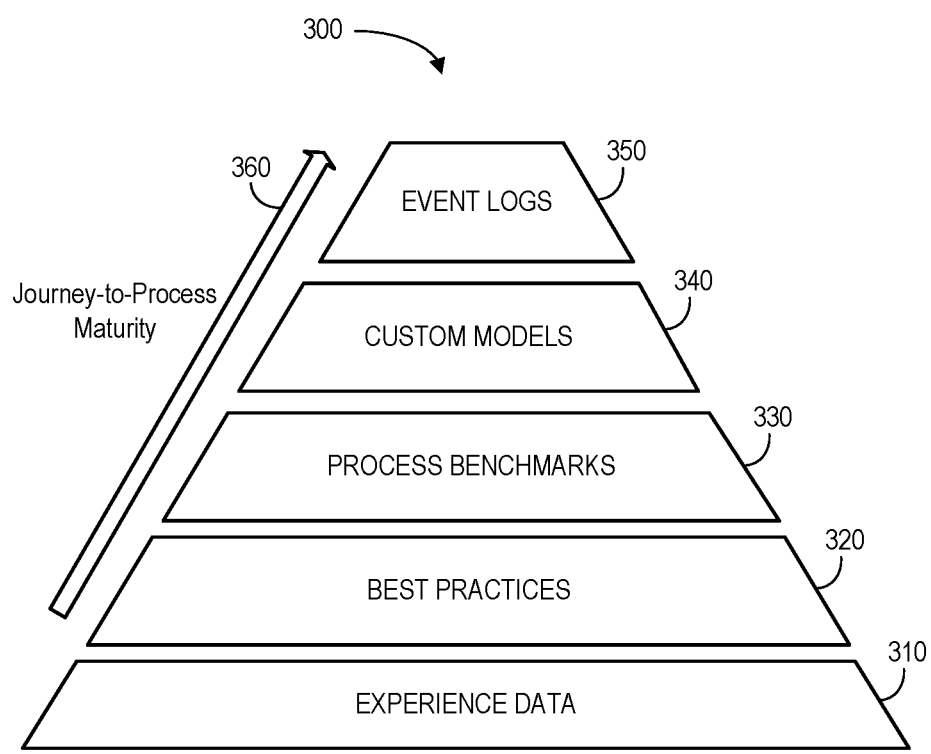
FIG. 3 is an illustration of a journey-to-process observability ladder according to some embodiments.

Journey-to-process analytics may fuse different data and knowledge types to improve business performance, even in challenging environments. For example, FIG. 3 is an illustration of a journey-to-process observability ladder 300 according to some embodiments. The ladder might be associated with business process management software and/or a web-based business process modeling tool such as those associated with SAP™ SIGNAVIO®. Initially, experience data 310 may be analyzed in the context of process management using best practices 320 and/or process benchmarks 330 (e.g., via software that lets search and explore content including business-capability and solution maps, process models, metrics, product recommendations, etc.). Moreover, custom models 340 may map the experience data 310 to specific activities, stages, or steps. Finally, event logs 350 may find correlations between a process and the experience data. Such an approach may fuse data of various granularity and provide a comprehensive inside-out map of an organization's operations based on process and journey models that provide connections between different data analysis views (enabling a holistic perspective on journey-to-process maturity 360 and observability).

Figure 4:
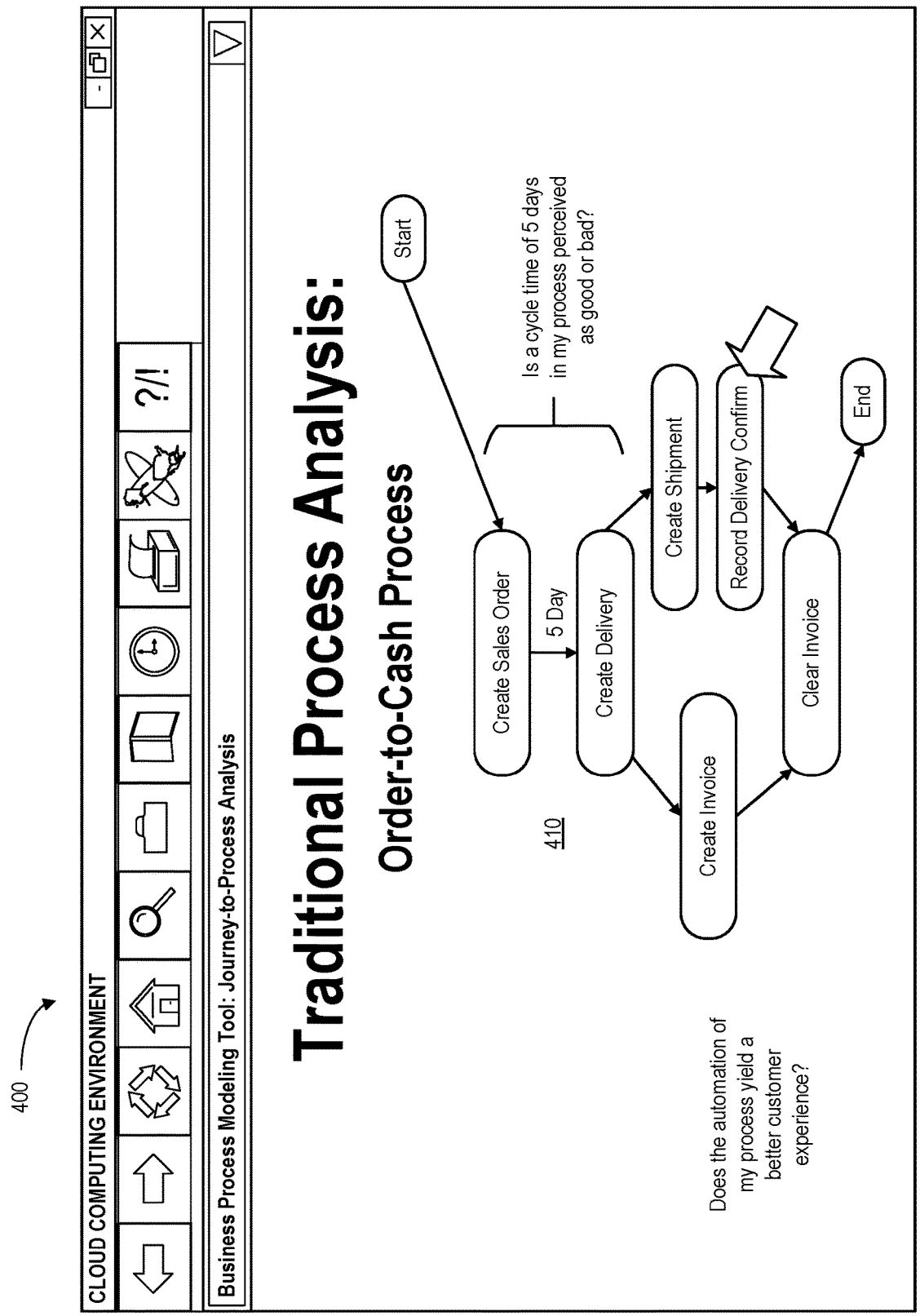
FIG. 4 is an example of traditional process analysis.
Figure 5:
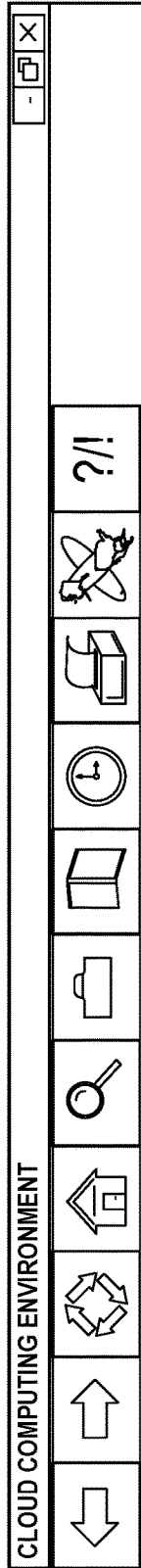
FIG. 5 shows an example of traditional customer sentiment feedback capture.

FIG. 4 is an example of traditional process analysis 400 for an order-2-cash process 410. The average time between creation of a sales order and a delivery is five days. Note that traditional process analysis aims to answer what happens in the process, but this process-focused approach does not help an enterprise understand customer impact, such as "Is a cycle time of 5 days in my process perceived as good or bad?" or "Does automation of the process yield a better customer experience?" FIG. 5 shows an example of traditional customer sentiment feedback capture 500. In particular, the common approach is to determine analytics and sentiments by capturing customer feedback response to questions 510 that have been submitted 520, such as "How satisfied are you with the resolution of the ticket?" (with a numerical rating) or "Is there anything else you would like to tell us?" (with a free text response). Note, however, that this experience-focused only approach does not help understand what happened in the processes (e.g., "why something happened" is missing).

Some embodiments described here provide an approach to obtain an overview of the operational flow of analyzed processes alongside sentiments reflecting how the execution of this process is perceived by people contributing to it (and being affected by it). Embodiment may also provide a way of mapping from an inception of a survey judging a process to the actual process graphs (or models) that are being judged. This may be achieved in two ways. In a process-driven scenario, a survey is constructed around a process analysis (e.g., a process graph) question-by-question. As a result, the actual execution of the process may be enriched with people's sentiments and feedback. In an experience-driven scenario, there is no prior mapping between an execution model of a process and survey questions. In fact, there might not even be a survey (e.g., a set of social media messages may provide feedback). In this case, a mapping may be established, either manually or supported by, for example, a LLM that maps a question or comment into the activities of the process.

Figure 6:
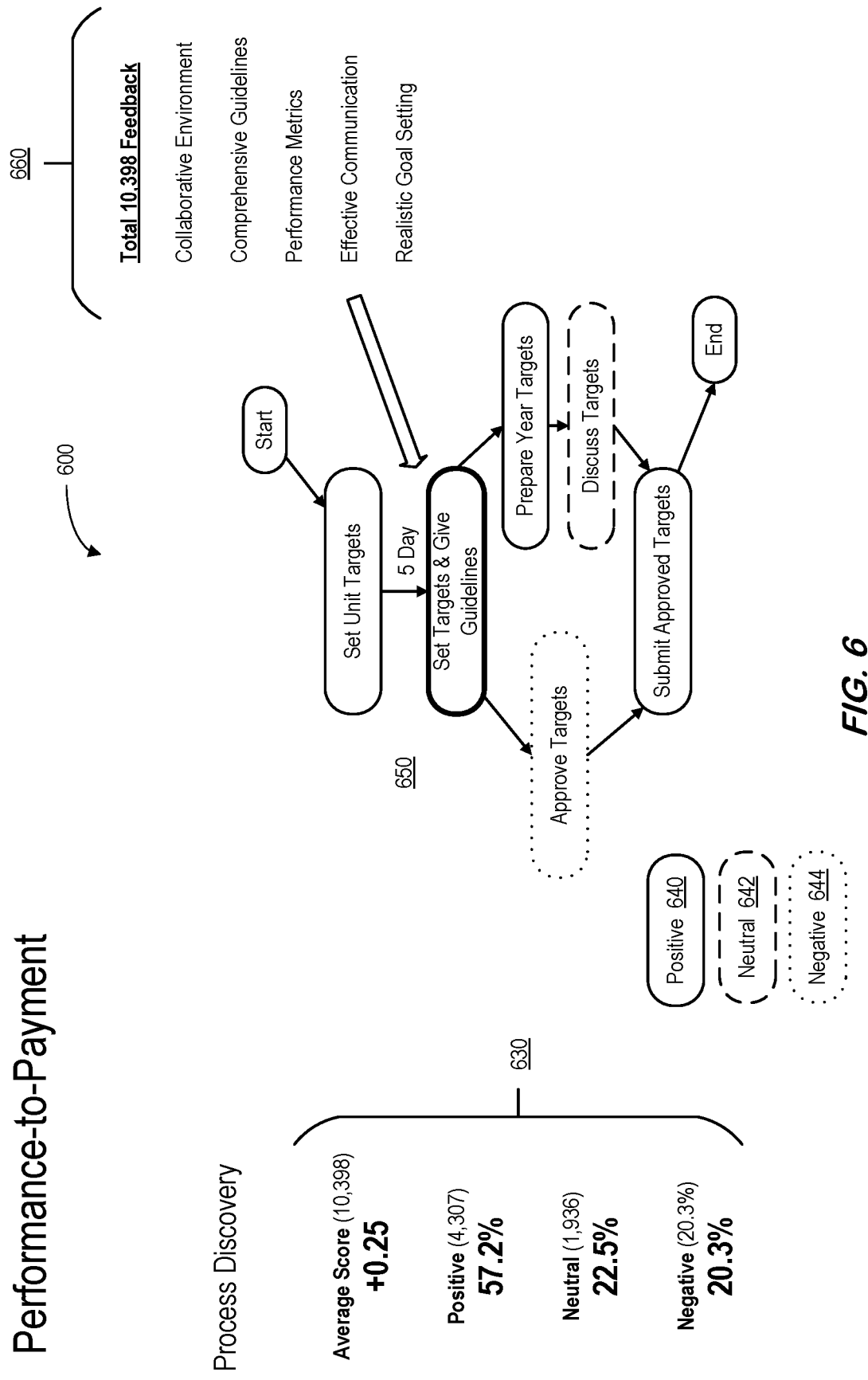
FIG. 6 is an example of an overview obtained for analyzed processes alongside captured sentiments in accordance with some embodiments.

Embodiments may provide a framework for obtaining an overview of a process model. For example, FIG. 6 is an example of an overview 600 obtained for analyzed processes alongside captured sentiments in accordance with some embodiments. The overview 600 includes dashboard summary information 630, including an average process score, positive feedback, neutral feedback, and negative feedback (along with how many feedback responses were categorized). A graphical representation of the process model 650 shows each process element along with an indication of whether that element was positive 640 (solid line), neutral 642 (dashed line), or negative 644 (dotted line). Moreover, aggregate summary information 660 is provided when an element in the model is selected 650 (with the "Set Targets & Give Guidelines" elements shown selected in FIG. 6).

Figure 7:
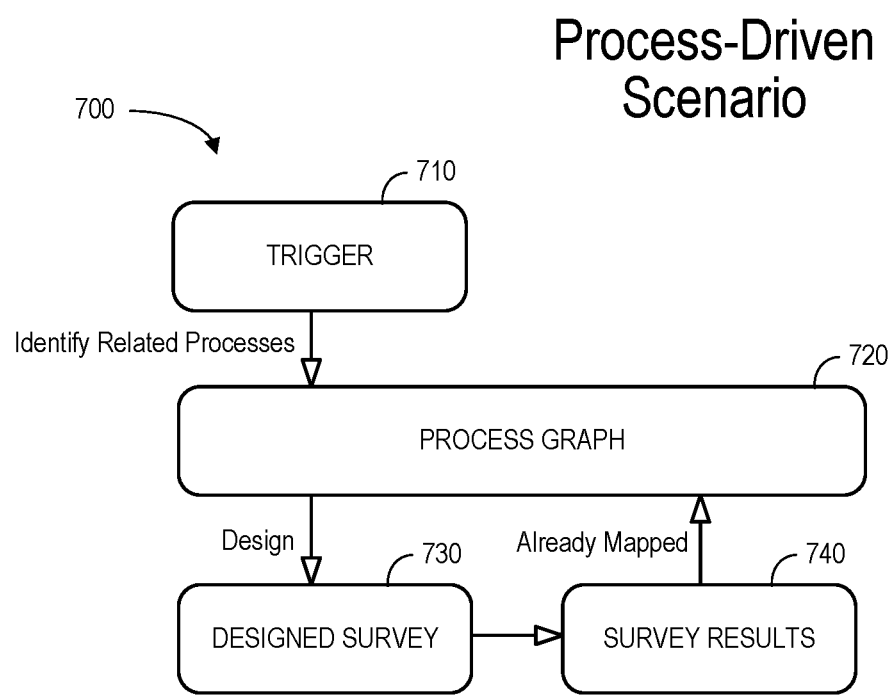
FIG. 7 is a high-level example of a process-driven scenario according to some embodiments.
Figure 8:
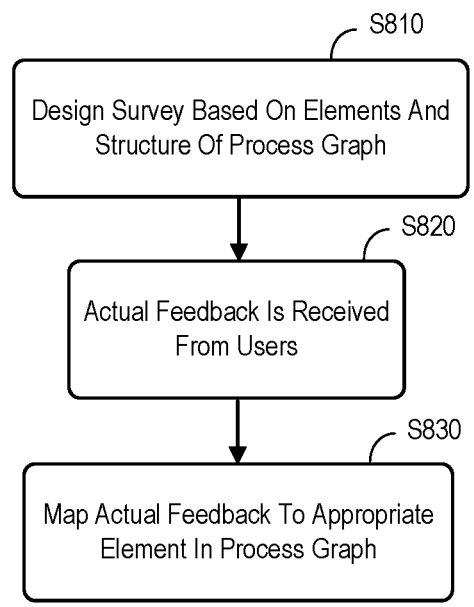
FIG. 8 is a process-driven method in accordance with some embodiments.

FIG. 7 is a high-level example of a process-driven scenario 700 according to some embodiments. Usually, a company gets indications that customers or users are unsatisfied with a process either directly (e.g., by monitoring social media via sentiment analysis concerning their brand) or indirectly (e.g., fewer customers buy their products, fewer requests are received and, generally speaking, services are used less than before). Any of these occurrences may trigger 710 an evaluation of the corresponding process to capture the experience of the customers of the services (and processes therein) the enterprise is providing. In the process-driven scenario 700, the process graph 720 associated with the trigger 710 is identified. Based on the process graph 720, a feedback survey was previously designed 730 such that survey results 740 will be already mapped to the process graph 720. FIG. 8 is a process-driven method in accordance with some embodiments. At S810, an enterprise designs a survey based on the elements and structure of a process graph. For example, a survey question might ask "Were you satisfied with the packaging?" which is automatically mapped to a packaging step in the process. As a result, when actual feedback is received from users (e.g., customers and employees) at S820 it can be simply mapped to the appropriate element in the process graph at S830.

Figure 9:
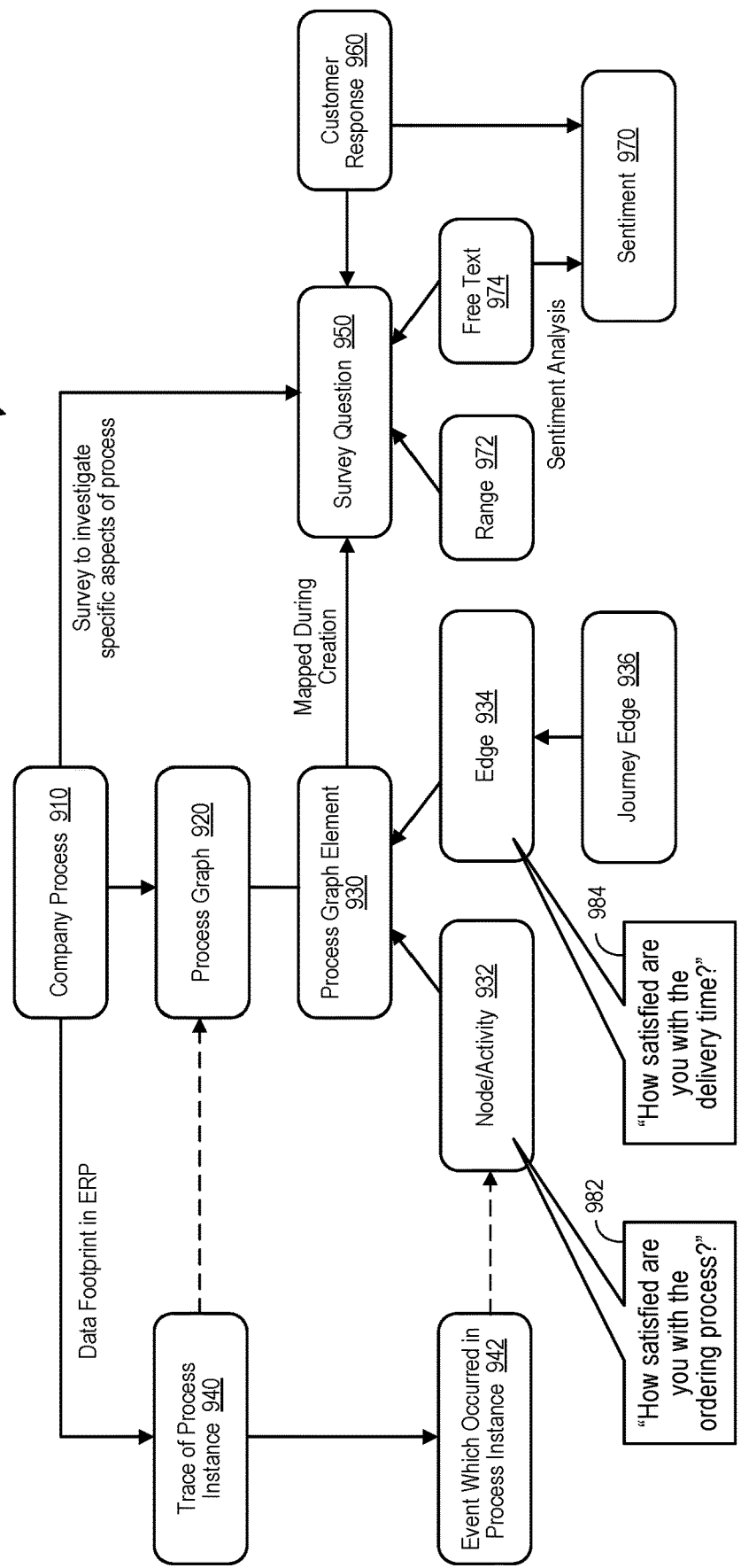
FIG. 9 is a process-driven scenario domain model according to some embodiments.

FIG. 9 is a process-driven scenario domain model 900 according to some embodiments. In particular, a company process 910 includes a process graph 920 with process graph elements 930, such as a node or activity 932 or an edge 934 (including a journey edge 936). Such a process graph 920 is usually obtained via methods such as process mining of the company process. The company process 910 may provide a data footprint associated with Enterprise Resource Planning ("ERP") or similar enterprise software systems to trace a process instance 940 (associated with the process graph 920) and an event which occurred in a process instance 942 (associated with a node or activity 932). The company process 910 was used to create a survey that was designed to investigate specific aspects of the process. This resulted in survey questions 950 that were mapped during creation of the survey. For example, a question such as "How satisfied are you with the ordering processes?" 982 might be mapped to a particular node or activity 932. Similarly, "How satisfied are you with the delivery time?" 984 might be mapped to a particular edge 934, e.g., which represents the time between the customer creating the order and the customer receiving the goods. Customer responses 960 to the survey may include numerical ranges 972 (e.g., 1 through 10), free text 974 (e.g., based on sentiment 970 analysis), and/or other elicitation techniques.

Figure 10:
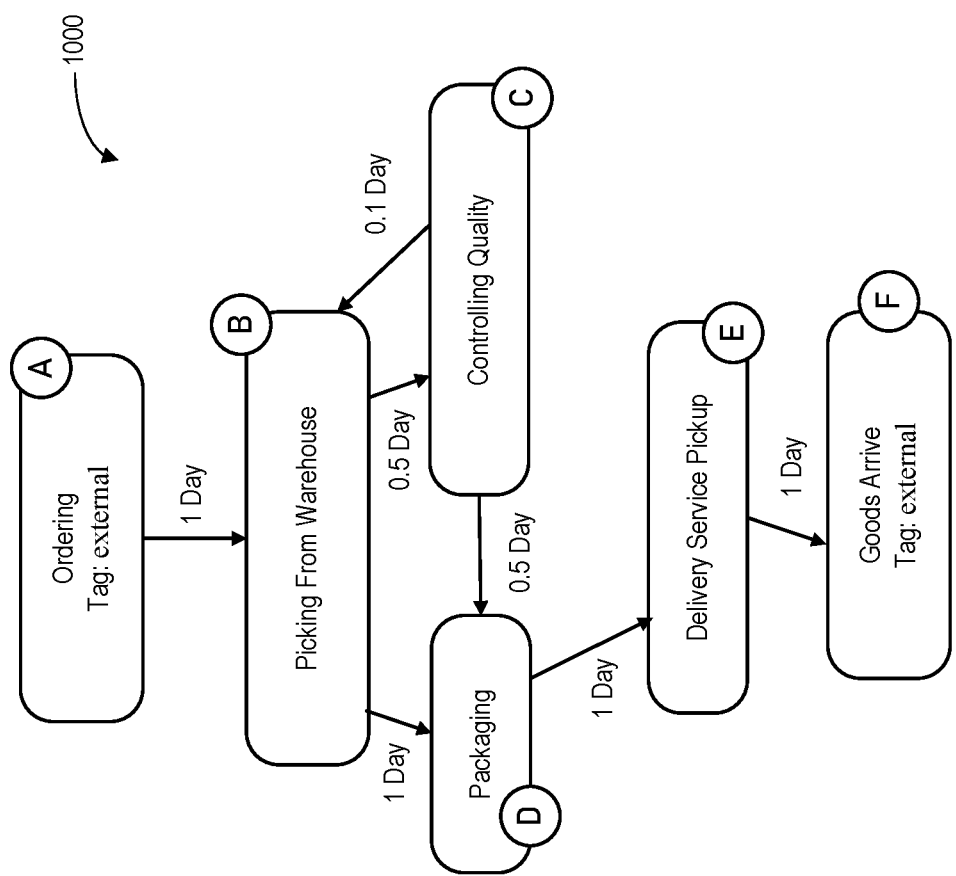
FIGS. 10 through 13 illustrate a process-driven domain scenario in accordance with some embodiments.

FIGS. 10 through 13 illustrate a process-driven domain scenario in accordance with some embodiments. In particular, FIG. 10 is a process graph 1000 (as represented in 920) that begins at (A) with an ordering node (which was tagged as "external" to an enterprise as it is triggered from the customer and, thus, externally visible). That is followed by internal activities such as picking goods from a warehouse at (B), controlling their quality at (C), and packaging at (D). Finally, delivery service pickup occurs at (E) and the goods arrive at (F) (which was also tagged as "external" to the enterprise as this is also visible for the customer). Note that edges between the nodes are each associated with a time value representing the average delay between the start and end points of the edge (e.g., 1 day, 0.5 days, etc.). In this process-driven scenario the company knows the ins and outs of the process model 1000 (e.g., via process mining) and creates survey questions based on this knowledge—this ensures that the analysis results are mapped accordingly and the process overview is enriched with sentiment data wherever it was elicited from customers and users no matter what they bought or where they are located—which are important sentiment analysis dimensions later on.

Figure 11:
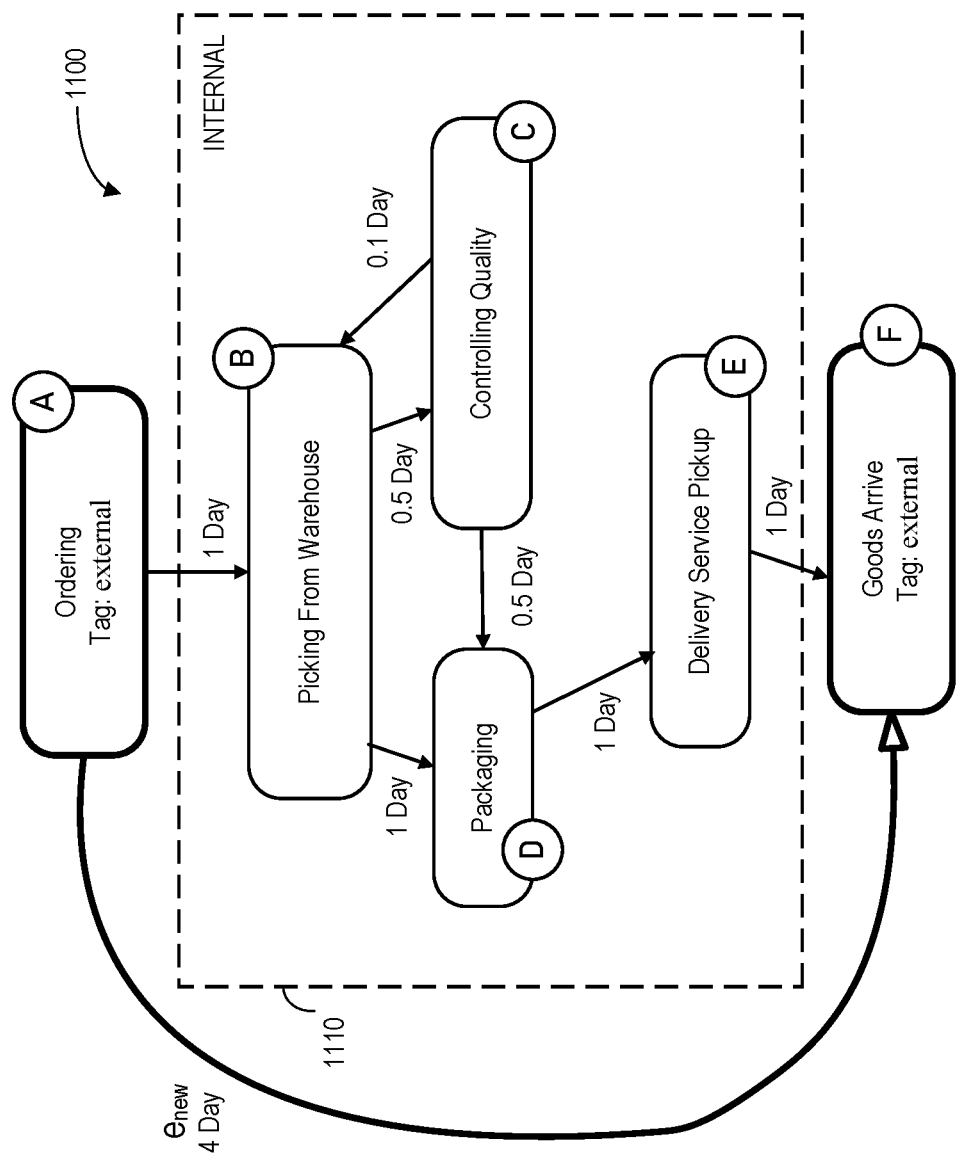

Embodiments may also provide an understanding of a customer's (external) perspective. For example, FIG. 11 shows a process model 1100 where a number of nodes internal to an enterprise have been grouped together 1110. That is, customers are not aware of the process steps which happen "inside" the company. This means, for example, that the customer does not know if or when "controlling quality" takes place or if other steps are taking place. While, in an ordering scenario, the customer might receive events and notifications about, for example, the package leaving the warehouse at (E), any discrete steps before and afterwards are unknown—such as was there a dedicated picking at (B), a dedicated packaging at (D), or even a quality check at (C).

From the outside, the customer also does not know, for example, how long each of these steps usually takes and how many process variations the company might have for different goods. What the customer does experience, however, is the overall time it takes from ordering the goods until they arrive: (A) and (F) are customer touchpoints. To capture this customer perspective, internal 1110 details of the process are clustered and abstracted. This can be achieved by tagging nodes and edges as internal or external, resulting in new (customer) journey edges which the customer directly experiences (e.g., the edge $e_{new}$ between ordering at (A) and receiving the goods at (F)). The average time assigned to this edge represents the average duration of all traces between (A) and (F). For example, one trace could be the sequence <A, B, C, B, C, D, E, F> and the average time of several traces might be 4.6 days. Another trace may be <A, B, D, E, F> with an average time of 3.4 days. When a customer provides feedback, it is important to ensure that the sentiments (e.g., "took too long" for edge $e_{new}$) are mapped to the right trace to identify bottlenecks and address them accordingly.

Figure 12:
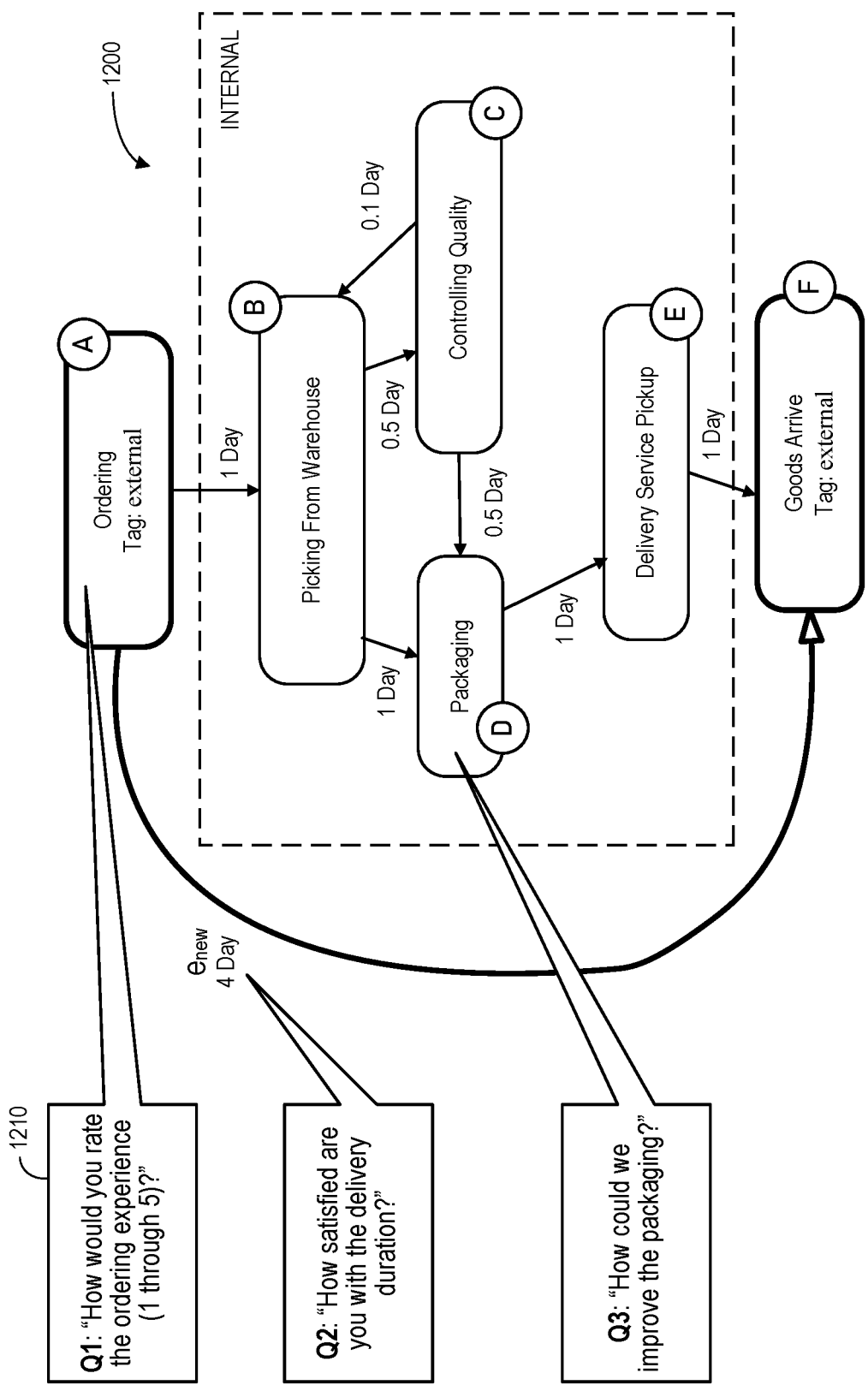

FIG. 12 shows a process model 1200 being mapped with questions 1210. That is, taking the various visibilities into account, a process owner can create survey questions related to individual parts of the process, such as those associated with particular activities or transitions and durations. By storing the identifiers of the elements referred to (e.g., with Q1 pointing to node (A)), all responses or insights (such as sentiments and improvement ideas) derived from them can later be seamlessly mapped to the process model 1200. Mapping targets for questions may comprise process graph 1200 elements such as nodes (activities) and (journey) edges representing transitions between nodes. Even though customers might not directly perceive an individual step, it is still possible to ask them about the result as illustrated by Q3 (mapped to (D)), where customers can provide feedback about a step they don't experience directly. Instead, each customer unpacking a broken item might have ideas about how this might be avoided in the future.

Figure 13:
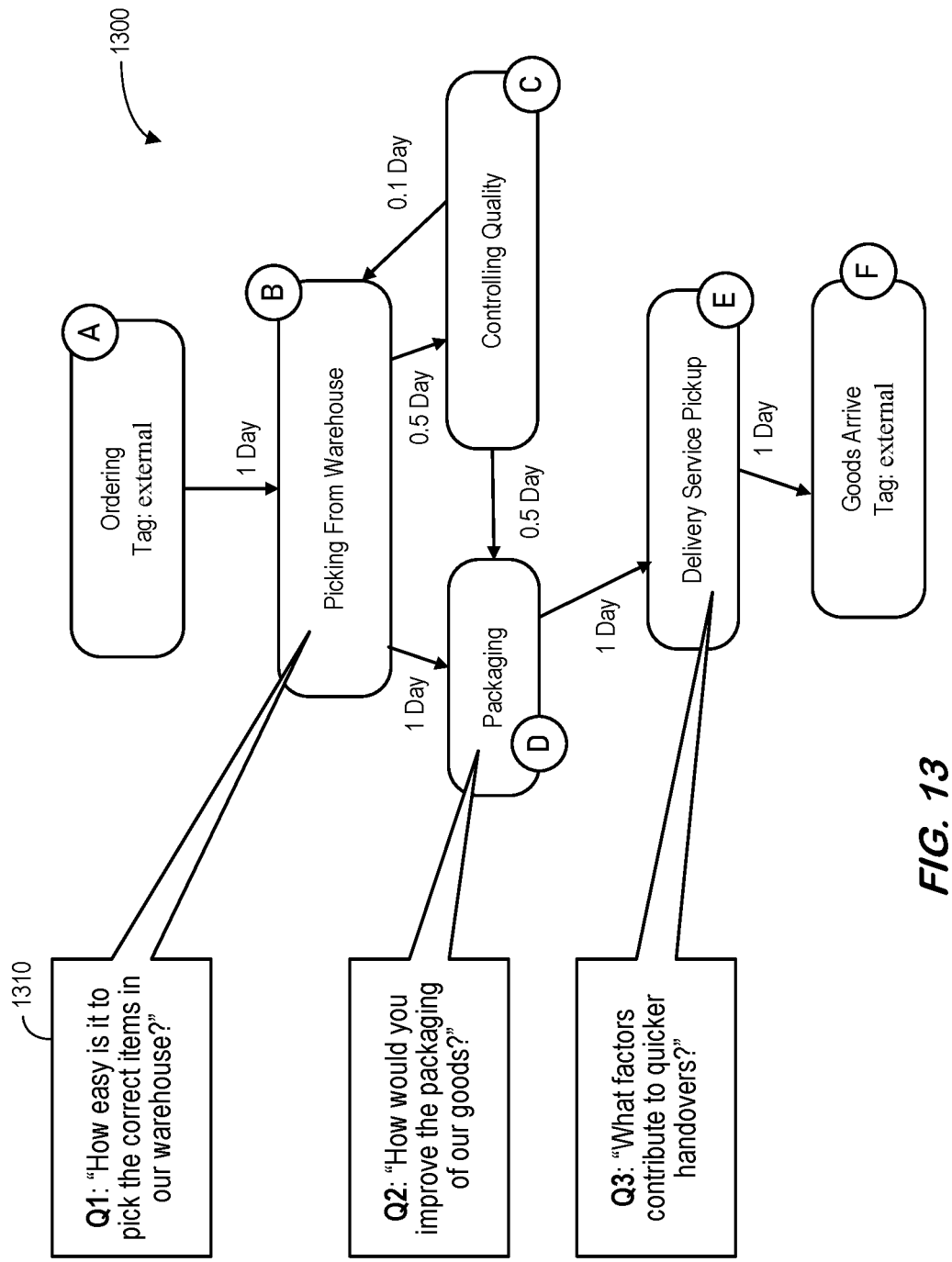

Some embodiments may let the system query internal perspectives (e.g., of employees working in the process). For example, FIG. 13 shows internal elements of a process model 1300 being mapped with questions 1310. To get feedback, sentiments, and improvement ideas from internal stakeholders the system may identify which aspects of the process (i.e., graph elements) are to be covered and create appropriate mapped questions. In the internal case, knowing the actual trace being commented on is less relevant as warehouse workers might abstract from individual items in their answer, arguing that, for example, every item below 4 centimeters is always hard to find along with concrete ideas about how to simplify the storage and retrieval of this class of items.

Figure 14:
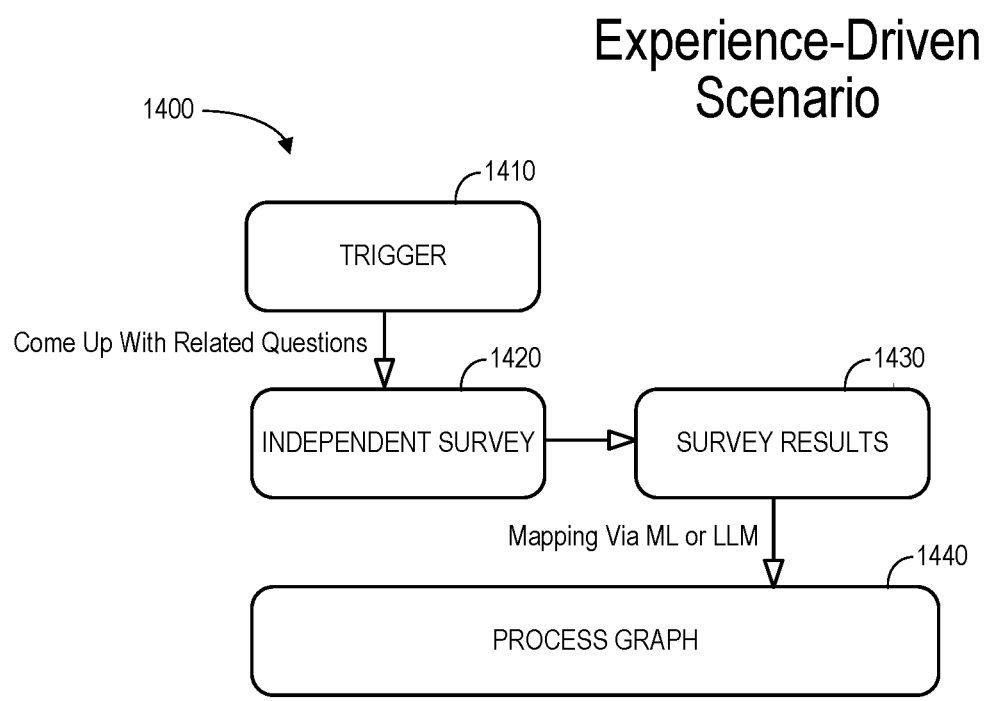
FIG. 14 is a high-level example of an experience-driven scenario in accordance with some embodiments.
Figure 15:
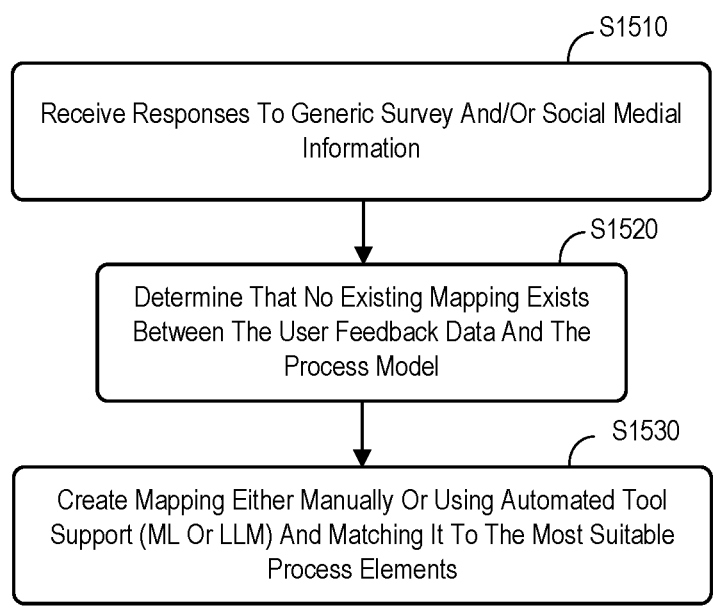
FIG. 15 is an experience-driven method according to some embodiments.

In addition to process-driven scenarios, embodiments of the framework may consider experience-driven scenarios. For example, FIG. 14 is a high-level example of an experience-driven scenario 1400 in accordance with some embodiments. A trigger 1410 may result in evaluation of an independent survey 1420 which includes potentially arbitrary user feedback information (e.g., data that is not mapped to particular steps of a process). The survey results 1430 can then be automatically mapped to a process graph 1440 using ML and/or LLM techniques. That is, in an experience-driven scenario 1400, a generic survey might be created without detailed knowledge of the process (e.g., only from a marketing department without involvement of the process owners). Similarly, social media information might be collected. In either case, there is no dedicated mapping survey questions, their answers, and the sentiments that are captured to a specific activity, transition, or process variant (variations based on, for example, a product category or the country in which the business was conducted). Such a mapping needs to be created either manually or using automated tool support such as a LLM reading the feedback and matching it to the most suitable process elements. FIG. 15 is an experience-driven method according to some embodiments. At S1510, the system may receive responses to a generic survey and/or social media information may be collected. At S1520, it may be determined that no prior mapping exists for this feedback data to the process model. At S1530, such a mapping is created and applied to the user feedback data.

Figure 16:
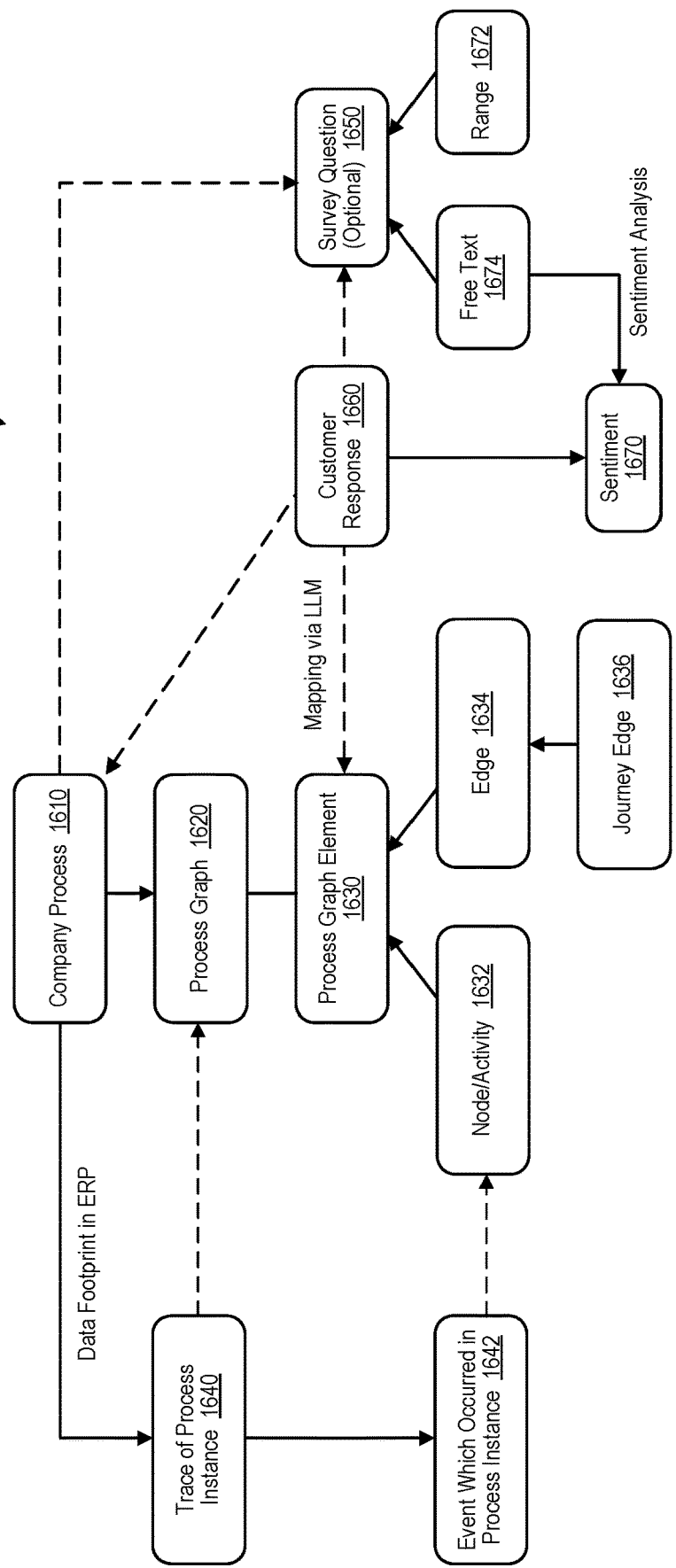
FIG. 16 is an experience-driven scenario domain model in accordance with some embodiments.

FIG. 16 is an experience-driven scenario domain model 1600 in accordance with some embodiments. As before, a company process 1610 includes a process graph 1620 with process graph elements 1630, such as a node or activity 1632 or an edge 1634 (including a journey edge 1636). The company process 1610 may provide a data footprint associated with ERP or other enterprise software systems to trace a process instance 1640 (associated with the process graph 1620) and events which occurred in a process instance 1642 (associated with a node or activity 1632). The company process 1610 was not used to create survey questions 1650. As a result, when customer responses 1660 are received (either via a numerical range 1672 and/or free text 1674 as interpreted by sentiment 1670 analysis) the system automatically creates a mapping to process graph elements 1630 via an LLM.

Figure 17:
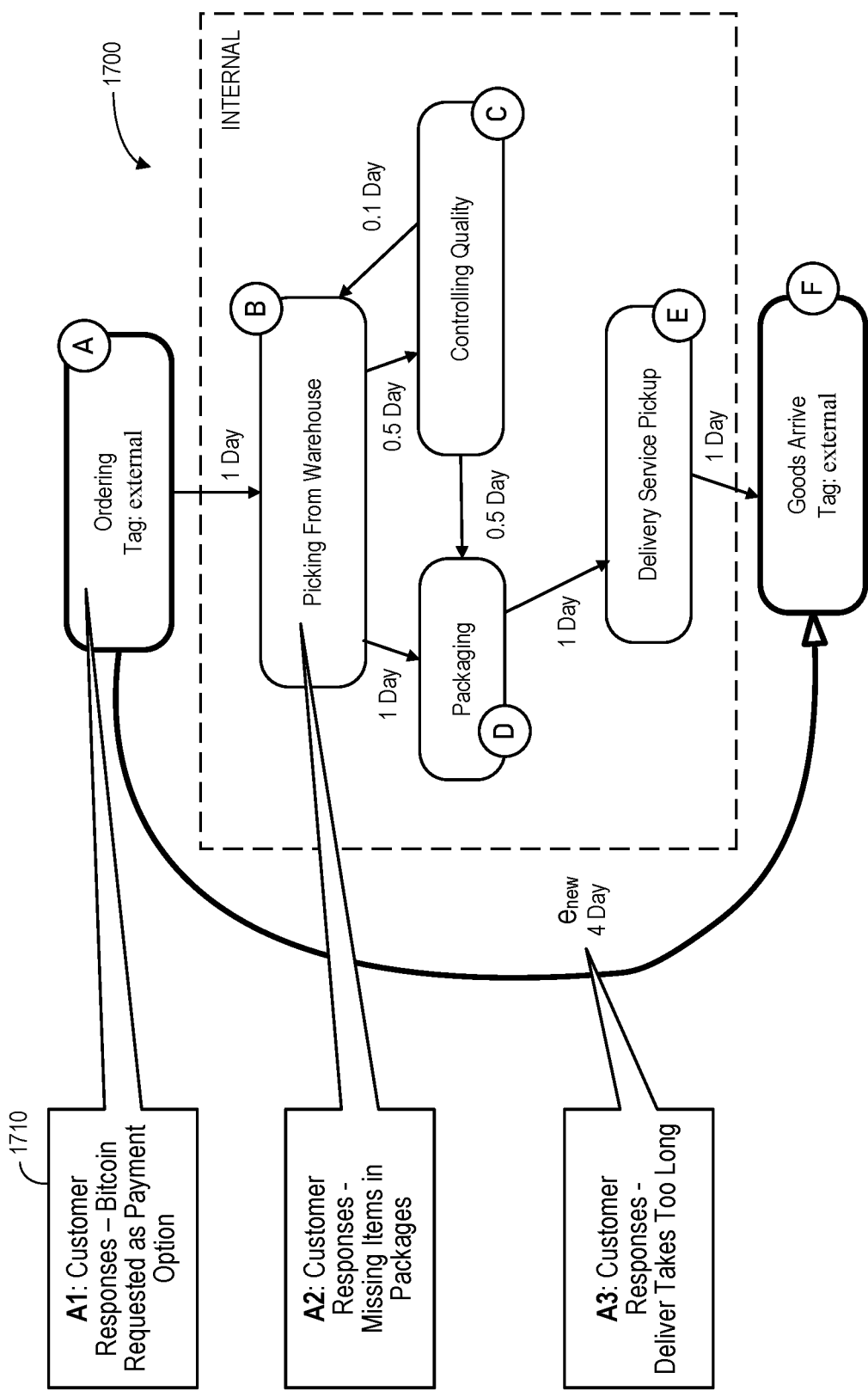
FIGS. 17 through 19 illustrate an experience-driven scenario according to some embodiments.
Figure 18:
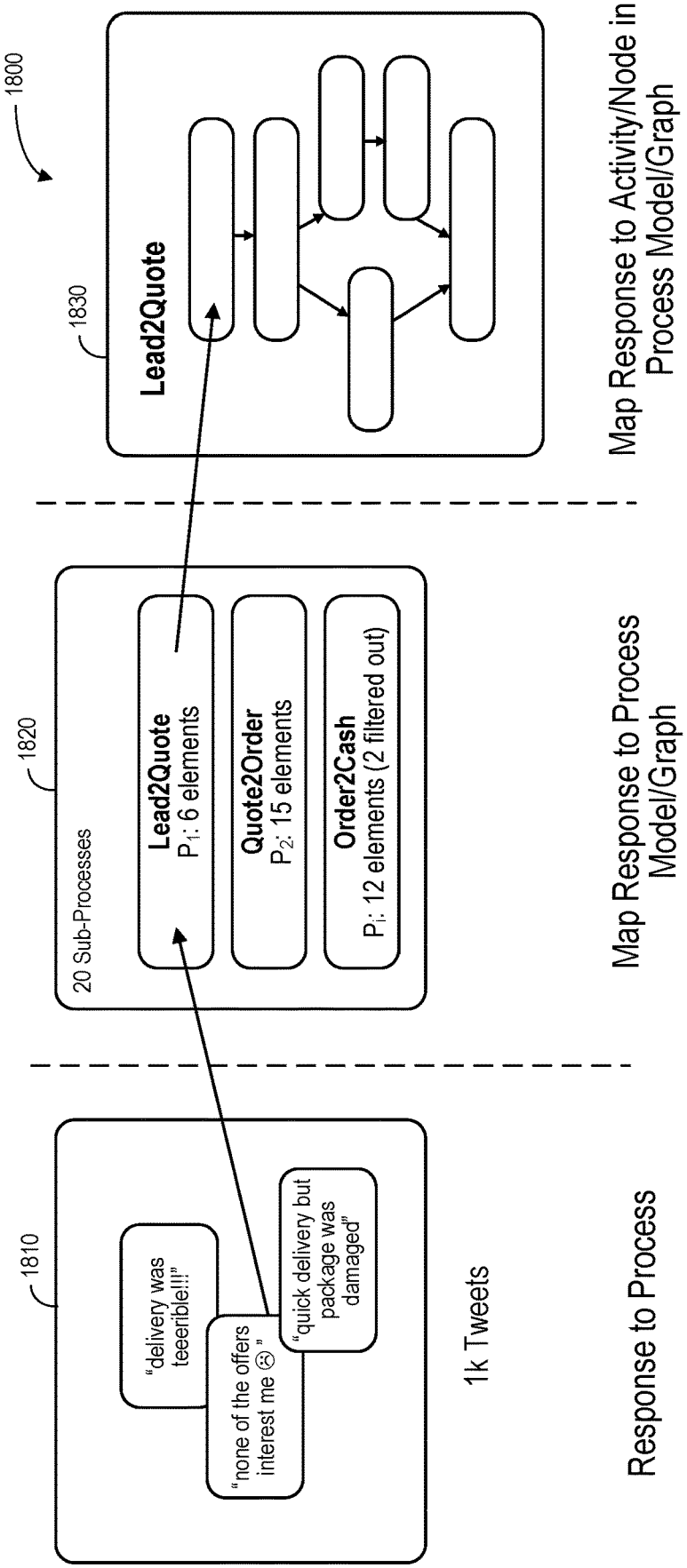
Figure 19:
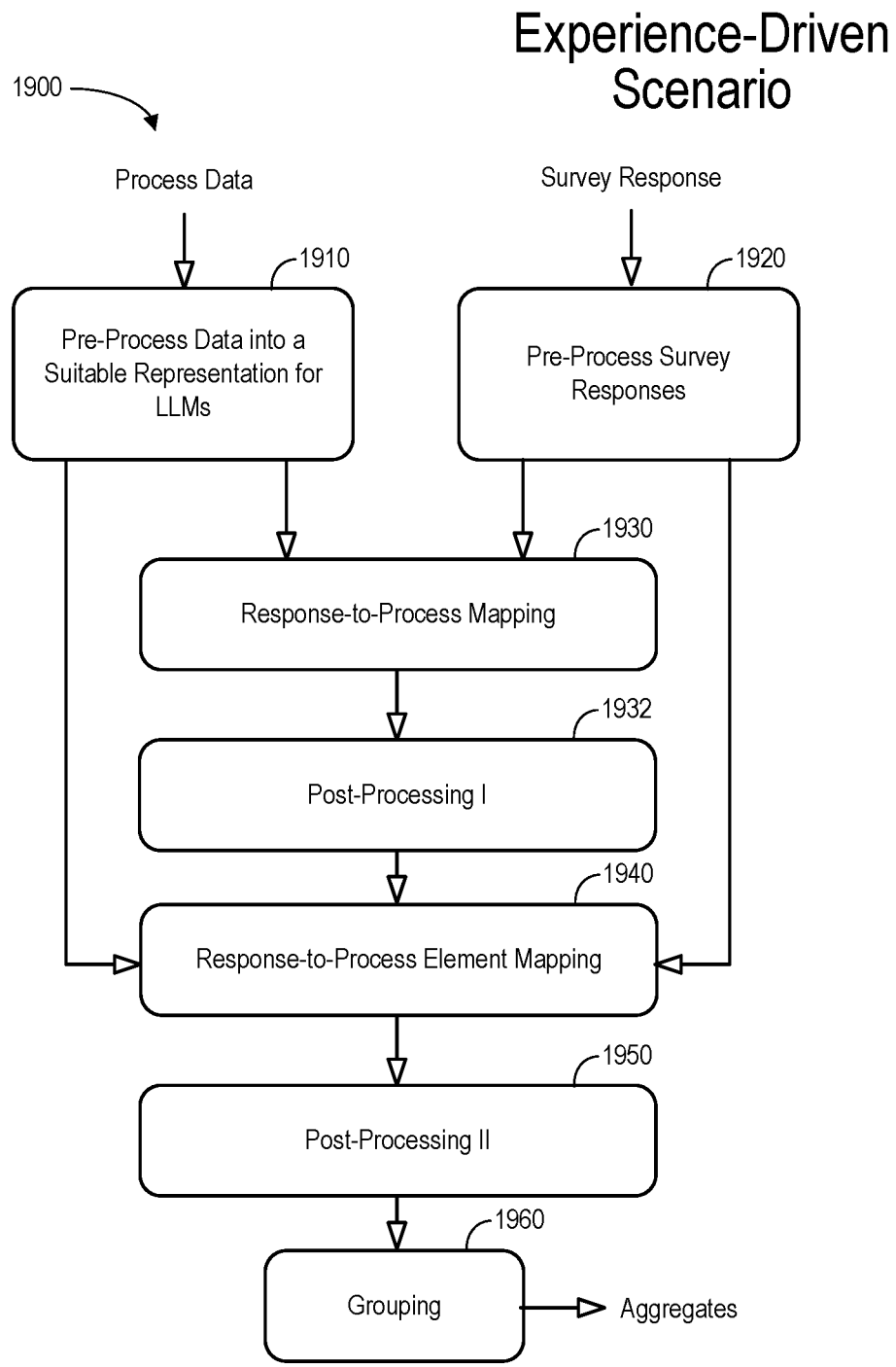

FIGS. 17 through 19 illustrate an experience-driven scenario according to some embodiments. In particular, FIG. 17 shows a process model 1700 and generic survey answers 1710 that have been automatically mapped to elements of the model 1700. The user feedback information might also comprise thousands of social media posts in which customers give (unsolicited) feedback about their experiences. The system may fuse the responses and aggregates to internal and external perspectives. In the case of generic surveys, the mapping of feedback to process elements can be created either manually or using tool support such as an LLM. Such an embodiment may provide insights (i.e., aggregates from multiple customer responses) without specific previous assumptions regarding the relevant issues. Similar to the process-driven scenario, the customer perspective can be captured by tagging nodes and edges as either "internal" or "external." Nodes which are tagged as "external" are visible to both customers external to the enterprise and employees internal to the enterprise. Nodes which are tagged as "internal" are visible to employees internal to the enterprise but not to customers external to the enterprise.

In this way, sentiments and feedback from thousands of tweets can be mapped to a lead-2-cash process (and 20 models associated with that process). For example, FIG. 18 shows such a technique 1800. In particular, responses to the process 1810 are collected and automatically mapped to a process model/graph 1820 (e.g., as described in connection with element 1930 of FIG. 19). Once mapped, the framework can map responses to an appropriate activity or node in a process model/graph 1830 for various process models representing sub-processes (e.g., lead-2-quote, quote-2-order, and order-2-cash) to provide overview insights (e.g., as described in connection with element 1940 of FIG. 19). Moreover, the overview can be queried from both internal and external perspectives.

FIG. 19 shows an approach to one example of the overall framework for an experience-driven scenario 1900. The framework receives process model data and pre-processes the information into a suitable representation for LLMs 1910 (e.g., activity names in Business Process Modeling Notation ("BPMN") Extensible Markup Language ("XML")). The representations can be enriched with additional information, such as process element descriptions. Similarly, survey responses are pre-processed 1920. The survey responses might be pre-processed, for example, to remove noise (e.g., "<no comment>") and/or to extract relevant parts of the survey response. This component may include LLMs. The result of the pre-processing to provided to create a response-process mapping 1930. For example, the LLM-based response-to-process mapping component 1930 can take as input both the process representations and survey responses and create a mapping by comparing embedding created by the LLM. Thus, out of dozens of different processes a company is running, component 1930 identifies the most suitable process. Post-processing I 1932 can then fuse the information as input for the response-to-process-element mapping 1940. The response-to-process-element mapping 1940 component may take as input both the process representations and survey responses and aligns them. The component 1940 may include generative LLMs as well as LLMs that compare process elements with survey responses (e.g., based on embeddings). In other words, while component 1930 chooses the right process, component 1940 chooses the correct element to correspond to the user feedback. The post-processing component II 1950 processes (e.g., parses) the previously created output to link the customer feedback to the correct elements in the process graph. The grouping 1960 component aggregates and clusters the feedback (e.g., what works well, what do most people complain about) to provide an aggregate overview on the process level.

Figure 20:
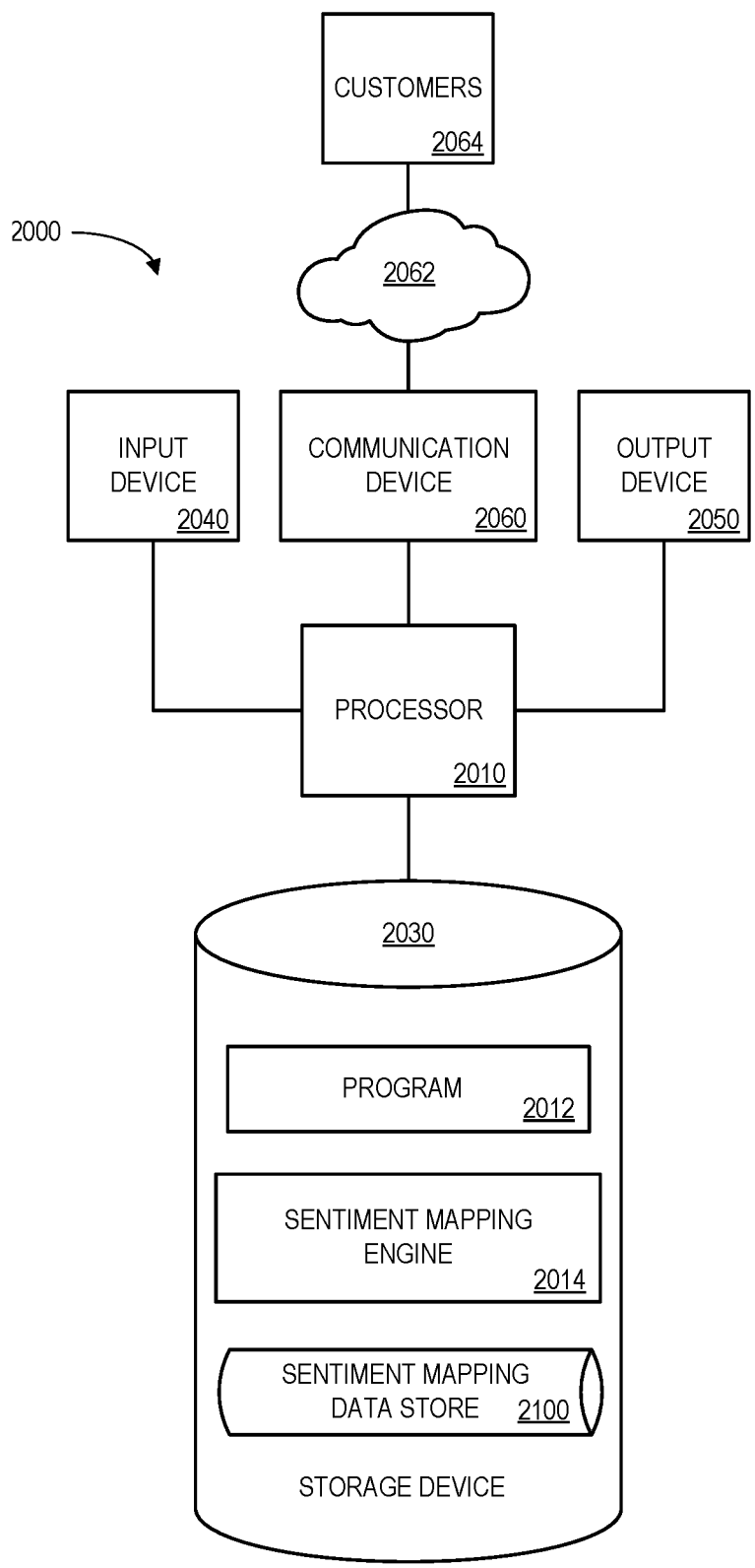
FIG. 20 is an apparatus or platform according to some embodiments.

Note that the embodiments described herein may be implemented using any number of different hardware configurations. For example, FIG. 20 is a block diagram of an apparatus or platform 2000 that may be, for example, associated with the system 100 of FIG. 1 (and/or any other system described herein). The platform 2000 comprises a processor 2010, such as one or more commercially available Central Processing Units ("CPUs") in the form of one-chip microprocessors, coupled to a communication device 2060 configured to communicate via a communication network 2062. The communication device 2060 may be used to communicate, for example, with one or more remote customers 2064, administrator platforms, etc. The platform 2000 further includes an input device 2040 (e.g., a computer mouse and/or keyboard to input mappings and/or process model information) and/or an output device 2050 (e.g., a computer monitor to render a display, transmit recommendations and alerts, and/or create reports about models, employees, customers, etc.).

The processor 2010 also communicates with a storage device 2030. The storage device 2030 may comprise any appropriate information storage device, including combinations of magnetic storage devices (e.g., a hard disk drive), optical storage devices, mobile telephones, and/or semiconductor memory devices. The storage device 2030 stores a program 2012 and/or sentiment mapping engine 2014 for controlling the processor 2010. The processor 2010 performs instructions of the programs 2012, 2014, and thereby operates in accordance with any of the embodiments described herein. For example, the processor 2010 may retrieve at least one of: (i) a process graph with process graph elements that include nodes and edges, and (ii) a process model representation from a process data store and receive user feedback data. The processor 2010 may determine if the information retrieved from the process data store is associated with a prior mapping of survey questions to the information retrieved from the process data store. If the information retrieved from the process data store is not associated with a prior mapping of survey questions, embodiments may utilize Machine Learning ("ML") to automatically map the user feedback data to the information retrieved from the process data store. The s processor 2010 may then automatically assign, group, and analyze the user feedback data to generate a recommended alteration.

The programs 2012, 2014 may be stored in a compressed, uncompiled and/or encrypted format. The programs 2012, 2014 may furthermore include other program elements, such as an operating system, clipboard application, a database management system, and/or device drivers used by the processor 2010 to interface with peripheral devices.

As used herein, information may be "received" by or "transmitted" to, for example: (i) the platform 2000 from another device; or (ii) a software application or module within the platform 2000 from another software application, module, or any other source.

In some embodiments (such as the one shown in FIG. 20), the storage device 2030 further stores a sentiment mapping data store 2100. An example of a database that may be used in connection with the platform 2000 will now be described in detail with respect to FIG. 21. Note that the database described herein is only one example, and additional and/or different information may be stored therein. Moreover, various databases might be split or combined in accordance with any of the embodiments described herein.

Figure 21:
FIG. 21 is a portion of a sentiment mapping data store in accordance with some embodiments.

Referring to FIG. 21, a table is shown that represents the sentiment mapping data store 2100 that may be stored at the platform 2000 according to some embodiments. The table may include, for example, entries identifying process models associated with an enterprise that have been analyzed by the framework. The table may also define fields 2102, 2104, 2106, 2108, 2110 for each of the entries. The fields 2102, 2104, 2106, 2108, 2110 may, according to some embodiments, specify: a process model identifier 2102, a process model type 2104, user feedback data 2106, mapping to graph elements 2108, and a recommended alteration 2110. The sentiment mapping data store 2100 may be created and updated, for example, when a new model is analyzed, new user feedback data is received, etc.

The process model identifier 2102 might be a unique alphanumeric label that is associated with a particular business process graph. The process model type 2104 might indicate if it is associated with a process-driven scenario or an experience-driven scenario. The user feedback data 2106 might indicate if the responses are a result of a designed survey, a generic survey, social media information, etc. The mapping to graph elements 2108 might indicate if such mapping was predetermined (e.g., in a process-driven scenario) or if automated mapping is required (e.g., in an experience-driven scenario). The recommended alteration 2110 might indicate, for example, that a process model element should be moved, deleted, added, etc. or any other recommendation either directly or indirectly inferred from the feedback ("different colors or items" or "quality check step to be enforced for all orders above 100 EUR," respectively).

In this way, embodiments may provide an integrated framework for process model analysis in a secure, automatic, and efficient manner. The journey-to-process connection of sentiments to processes may provide a direct interdependence between inside-out and outside-in on a data level. With the advent of novel generative artificial intelligence techniques, a user can understand the direct impact of a process execution (on the data level) on customer experience. Moreover, embodiments may let users steer process improvement from an outside-in view. Instead of optimizing automation rates, cycle times, and more with the assumption of increasing customer satisfaction, a direct impact can be derived and visualized. The described framework is a holistic, process-driven way of eliciting customer and employee sentiments based on an analytical process perspective and seamlessly combining the information.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 22:
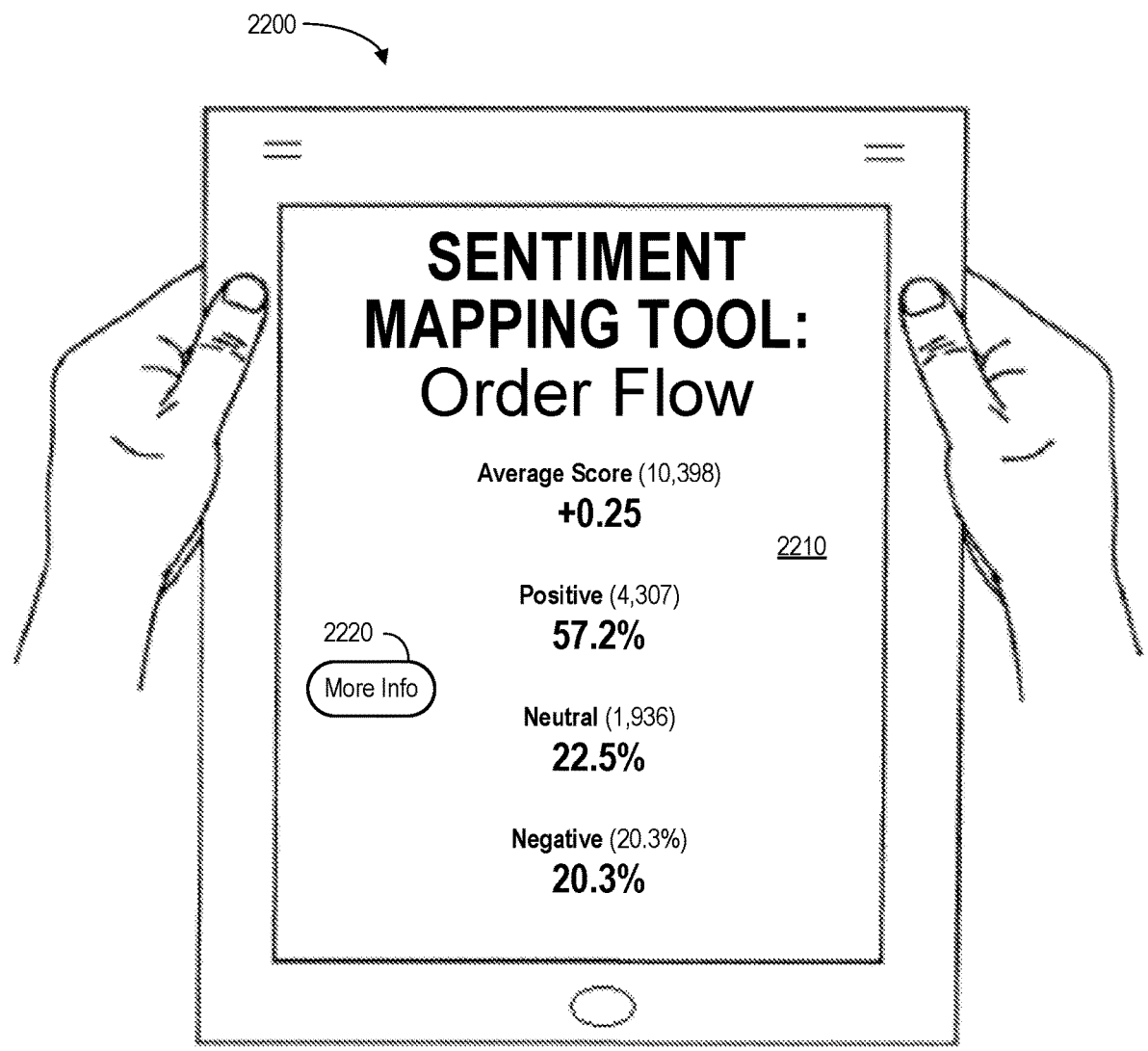
FIG. 22 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of models and scenarios, any of the embodiments described herein could be applied to other types of models and scenarios (e.g., a single model could have feedback information associated with both process-driven and experience driven scenarios). Moreover, the displays shown herein are provided only as examples, and any other type of user interface could be implemented. For example, FIG. 22 illustrates a tablet computer 2200 providing a sentiment mapping tool display 2210. The display 2210 might be used, for example, to modify aspects of a process model analysis framework, a model overview, etc. via selection of a "More Info" icon 2220.

Figure 23:
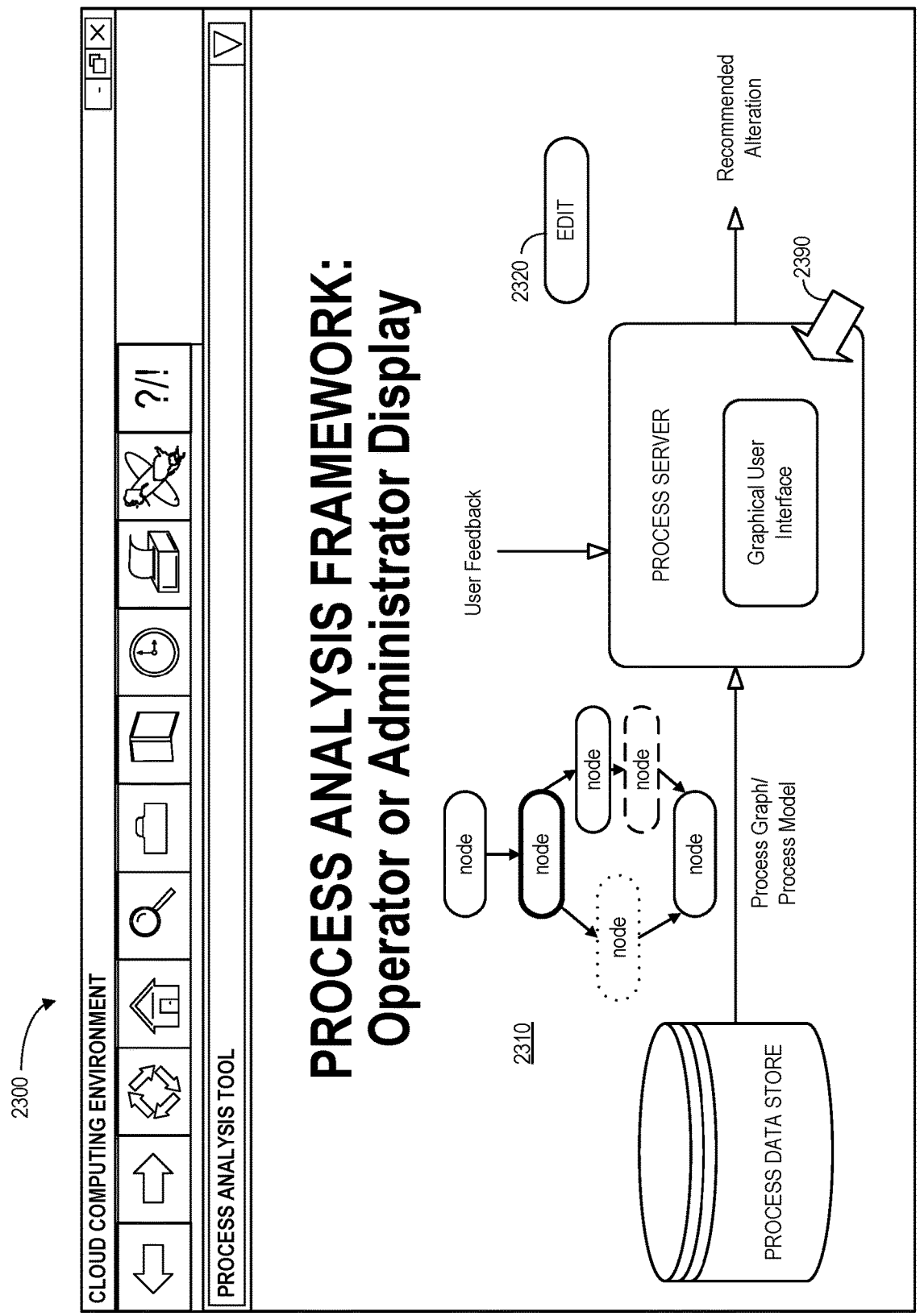
FIG. 23 is an operator or administrator display in accordance with some embodiments.

FIG. 23 is an operator or administrator display in accordance with some embodiments. The display 2300 includes a graphical representation 2310 of a process model analysis framework in accordance with any of the embodiments described herein. Selection of an element on the display 2300 (e.g., via a touchscreen or computer pointer 2390) may result in display of a pop-up window containing more detailed information about that element and/or various options (e.g., mapping options, process model details, user feedback data, etc.). Selection of an "Edit" icon 2320 may also let an operator or administrator adjust the operation of the system (e.g., to change system mappings, adjust a sentiment mapping data store, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with an enterprise, comprising:
a process data store containing a process model that represents an analytical representation of the enterprise's business processes and includes a process graph with ordered process step elements as generated via process mining; and
a process server, associated with the enterprise and coupled to the process data store, including:
a computer processor, and
a computer memory storing instructions that, when executed by the computer processor, cause the process server to:
retrieve information from the process data store,
receive user feedback data from customers external to the enterprise and employees internal to the enterprise,
determine if the information retrieved from the process data store is associated with a prior mapping of survey questions to the information retrieved from the process data store,
if the information retrieved from the process data store is not associated with a prior mapping of survey questions, utilize Machine Learning ("ML") to automatically map the user feedback data to the information retrieved from the process data store,
automatically assign the user feedback data in accordance with the prior mapping or the automatic mapping,
automatically group the assigned user feedback data to generate aggregated and clustered data using node and edge tags indicating whether process step elements are internal or external to the enterprise,
analyze the aggregated and clustered user feedback data to automatically generate a recommended alteration of at least one process step element in the process data store, wherein the recommended alteration is associated with deleting the process step element or reordering process step elements in the process graph, and
transmit the recommended alteration of the at least one process step.

2. The system of claim 1, wherein the analysis of the user feedback data includes automatically clustering and abstracting user feedback for subsets of elements internal to the enterprise separately from subsets of elements external to the enterprise.

3. The system of claim 1, wherein the user feedback data comprises user responses to survey questions including at least one of: (i) numerical sentiment ratings, (ii) free text, and (iii) other elicitation techniques.

4. The system of claim 1, wherein the information in the process data store is associated with a process-driven scenario and no prior mapping exists for the feedback data to the process model.

5. The system of claim 4, wherein the prior mapping of survey questions is associated with a design of the survey questions.

6. The system of claim 1, wherein the information in the process data store is associated with an experience-driven scenario and the feedback data is associated with a prior mapping of the feedback data to the process model.

7. The system of claim 6, wherein the automatic mapping is performed via a Large Language Model ("LLM").

8. The system of claim 6, wherein the user feedback data comprises social media information.

9. The system of claim 1, wherein the process server is further to display graphical representations of process elements, and selection of a graphical element results in an automatic display of aggregated and clustered data for that element.

10. A computer-implemented method associated with an enterprise, comprising:
  retrieving, by a computer processor of a process server, information from a process data store, wherein the process data store contains a process model that represents an analytical representation of the enterprise's business processes and includes a process graph with ordered process step elements as generated via process mining;
  receiving user feedback data from customers external to the enterprise and employees internal to the enterprise;
  determining if the information retrieved from the process data store is associated with a prior mapping of survey questions to the information retrieved from the process data store;
  if the information retrieved from the process data store is not associated with a prior mapping of survey questions, utilizing Machine Learning ("ML") to automatically map the user feedback data to the information retrieved from the process data store;
  automatically assigning the user feedback data in accordance with the prior mapping or the automatic mapping;
  automatically grouping the assigned user feedback data to generate aggregated and clustered data using node and edge tags indicating whether process step elements are internal or external to the enterprise;
  analyzing the aggregated and clustered user feedback data to automatically generate a recommended alteration of at least one process step element in the process data store, wherein the recommended alteration is associated with deleting the process step element or reordering process step elements in the process graph; and
  transmitting the recommended alteration of the at least one process step.

11. The method of claim 10, wherein the user feedback data comprises user responses to survey questions including at least one of: (i) numerical sentiment ratings, (ii) free text, and (iii) other elicitation techniques.

12. The method of claim 10, wherein the information in the process data store is associated with a process-driven scenario and no prior mapping exists for the feedback data to the process model.

13. A non-transitory, machine-readable medium comprising instructions thereon that, when executed by a processor, cause the processor to execute operations to perform a method associated with an enterprise, the method comprising:
  retrieving, by a computer processor of a process server, information from a process data store, wherein the process data store contains a process model that represents an analytical representation of the enterprise's business processes and includes a process graph with ordered process step elements as generated via process mining;
  receiving user feedback data from customers external to the enterprise and employees internal to the enterprise;
  determining if the information retrieved from the process data store is associated with a prior mapping of survey questions to the information retrieved from the process data store;
  if the information retrieved from the process data store is not associated with a prior mapping of survey questions, utilizing Machine Learning ("ML") to automatically map the user feedback data to the information retrieved from the process data store;
  automatically assigning the user feedback data in accordance with the prior mapping or automatic mapping;
  automatically grouping the assigned user feedback data to generate aggregated and clustered data using node and edge tags indicating whether process step elements are internal or external to the enterprise;
  analyzing the aggregated and clustered user feedback data to automatically generate a recommended alteration of at least one process step element in the process data store, wherein the recommended alteration is associated with deleting the process step element or reordering process step elements in the process graph; and
  transmitting the recommended alteration of the at least one process step.

14. The system of claim 1, wherein event logs at the process server correlate the process model with the user feedback data to fuse data of various granularity and provide an inside-out map of the enterprise's operations based on process and journey models with connections between different data analysis views.

* * * * *